May 21, 1935.  S. K. BISHOP  2,001,999
SEAT ADJUSTER
Filed Nov. 26, 1932   2 Sheets-Sheet 1
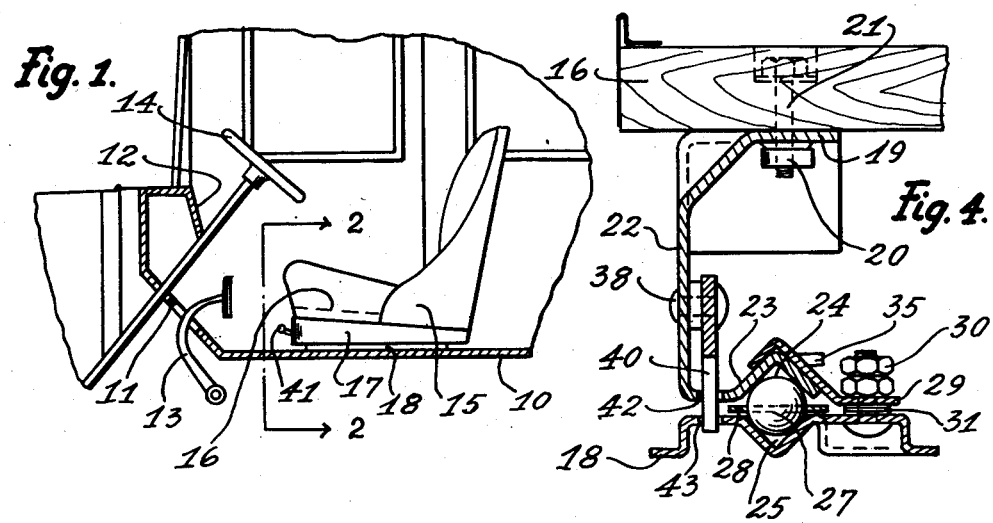
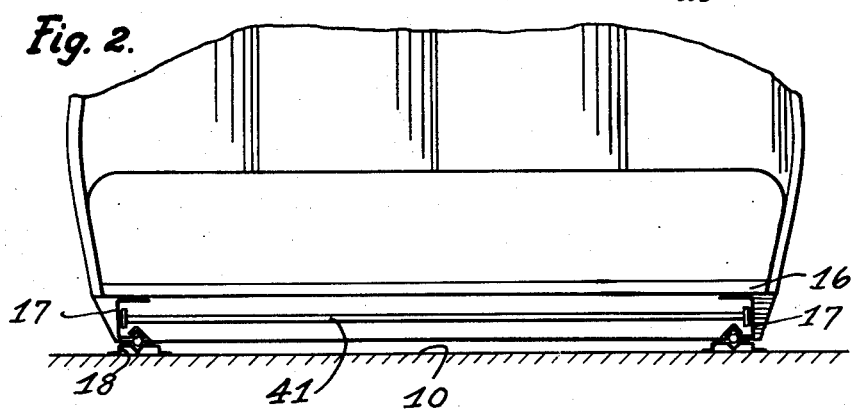
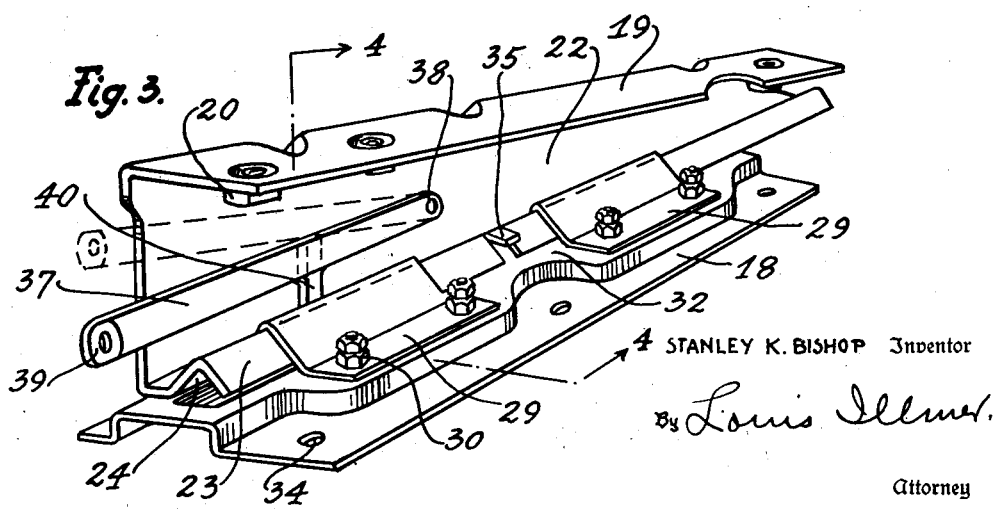
STANLEY K. BISHOP Inventor
By Louis Illmer
Attorney

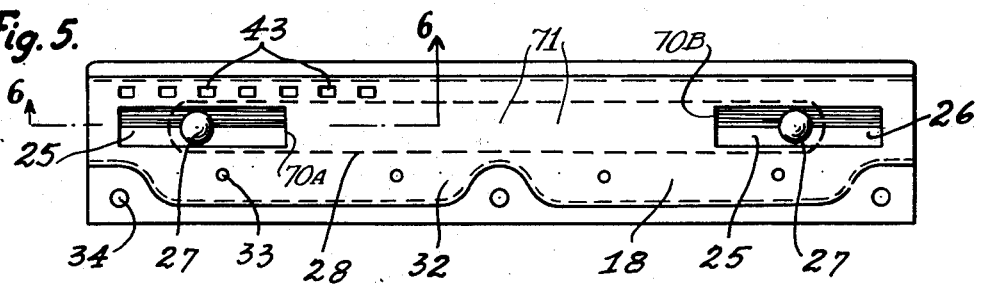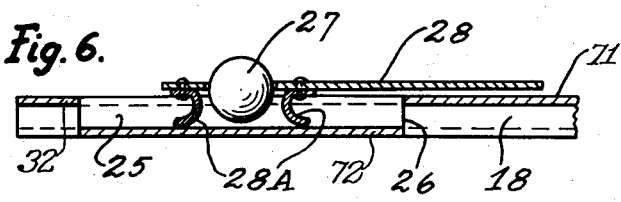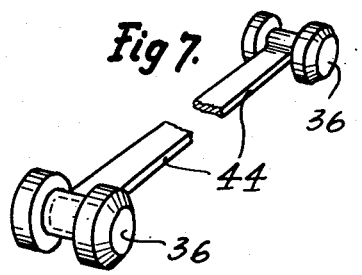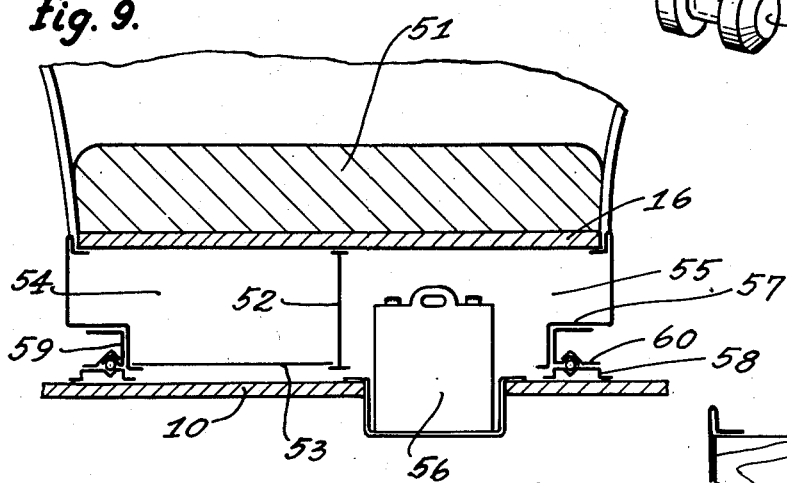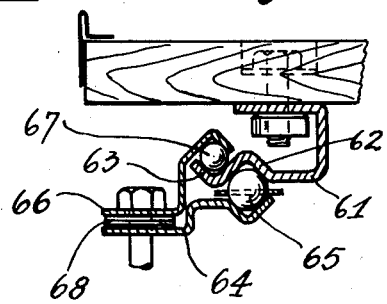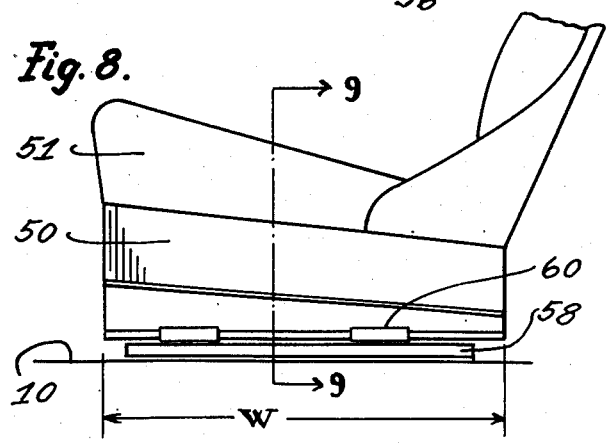

Patented May 21, 1935

2,001,999

UNITED STATES PATENT OFFICE 2,001,999

SEAT ADJUSTER

Stanley K. Bishop, Binghamton, N. Y., assignor to The Brewer-Titchener Corporation, Cortland, N. Y., a corporation of New York Application November 26, 1932, Serial No. 644,415

5 Claims. (Cl. 155—14)

This invention relates to a simple and compact appurtenance for conveniently adjusting vehicle or any similar seats, and in particular provides for a comfortable driver's seat that can readily be shifted with the minimum of frictional drag to allow unfettered manipulation of the control pedals of an automobile or the like. A feature of the present invention resides in the use of companion guide rail members across which the seat is mounted upon ball or roller bearings in an improved manner and by means of which my seat may be translated bodily into different positions. Upon release of a suitable latching mechanism, my seat may be easily shifted lengthwise of the rails by a seated driver without need of any supplementary screw or the like gear actuating devices. After the seat has been selectively placed to provide for the desired leg room, my latching mechanism is again interlocked with the guide rails to positively retain the seat in readjusted position.

The primary object of my improvements is to afford a durable and self-contained commodity of the character indicated that comprises a few simple but sturdy parts capable of being economically fabricated and applied beneath a vehicle or other seat of suitable design.

A further objective is to devise seat adjusting members requiring only a limited number of movable joints subjected to wear and to wholly correct and keep the seat mounting free from rattle or the like depreciation by centralized wear take-up means. A still further object is to provide for an accessible tool chest or storage chamber that is ball mounted beneath the seat base and made bodily shiftable with said seat at the minimum of tractive effort.

To this end and the accomplishment of other new and useful results, said invention further consists in novel features of structure and manipulation, all of which will hereinafter be more fully set forth.

Reference is had to the accompanying two sheets of drawings which are illustrative of certain specific embodiments of my invention, particularly as applied to automotive purposes, and in which:

Figure 1 is a fragmentary elevational view as taken in longitudinal section through the body portion of a motor car showing its front seat equipt with my devices, while Fig. 2 is a front view of such seat.

Fig. 3 represents in perspective, a subsidiary assembly of my two-part guide rails as applied to the Fig. 1 style of shiftable seat installation; and Fig. 4 shows a cross-section thereof taken along line 4—4 of Fig. 3.

Fig. 5 details a plan view of the lowermost rail component having a pair of ball bearings spacedly mounted in the respective race slots thereof; and Fig. 6 shows a vertical cross-section taken along line 6—6 of Fig. 5.

Fig. 7 illustrates an alternative roller type of antifriction bearing member.

Fig. 8 depicts an elevational end view of a modified seat supporting structure of the storage chest type; and Fig. 9 is a transverse section taken along line 9—9 of Fig. 8.

Fig. 10 cross-sectionally shows an alternative seat mounting in which its relatively slidable carrier members are made to roll between dual ball bearings.

Referring first to Fig. 1, this is intended to schematically indicate certain conventional automobile elements indirectly associated with my seat adjuster; namely a body floor 10, an upturned foot board 11, an instrument board 12, a car control pedal 13, a steering wheel 14, and the like. Located rearwardly of said wheel is shown a transversely disposed driver's seat 15 having my improvements embodied therein. The rectangular base or cushion frame 16 and back of this seat are slidably mounted across a pair of laterally spaced support members; while the latter are shown exposed to view, they can readily be concealed behind a suitable base skirt. Each such seat upholding member comprises a carrier element 17 attached to and depending from the base; also a rectilinear companion track or sole plate element 18 along which said carrier element is intended to ride longitudinally. Said carrier and sole plate elements are each preferably stamped up from relatively heavy and stiff sheet metal.

In my illustrative exemplification, the base carrier 17 is given a cross-sectionally channel shape of which the topmost web flange 19 is equipt with one or more inset nuts 20 of the swaged-in-place type adapted to cooperate with a fastening bolt 21 in the fashion represented in Figs. 3 and 4. The depending web plate 22 of each carrier is here placed outermost and its free marginal edge inturned to provide for a toe flange 23 which is preferably given a V-like cross-sectional profile forming the continuous carrier groove 24. Said toe flange is shown spaced in a longitudinally converging relation to the top flange 19, which disposition imparts a fixed rearward tilt to the flat bottom face of the cushion frame 16. The stationary sole plate 18 serves as a track element and may be shaped up in dished cross-sectional profile to afford a relatively flat upturned face 32 (see Fig. 5) having impressed therein one or more race slots or pockets such as 25 that may be longitudinally spaced in tandem arrangement. The slot ends are preferably pierced or otherwise opened to provide a drain outlet 26 for the escape of dirt or other foreign matter that may otherwise tend to collect in the race slots. To this end, it is preferred to parallelly pierce the sheet metal face 32 crosswise of the groove axis as at 70A, 70B, etc. in order to provide for a medial face region 71 that is kept raised relative to the contiguous bottommost or depressed nose region 72 of the respective V shaped groove pockets 25 in the manner cross-sectionally shown in Fig. 6.

Each such race slot or longitudinally separated trackway may be equipt with a floating ball 27 or the equivalent antifriction medium. In order to more positively maintain a fixed distance between such balls, I further resort to spacer or the like cage strap means 28 having an aperture at each end thereof adapted to freely receive and ride upon a ball as indicated by dotted outline in Fig. 5. Fig. 6 shows such strap equipt with a felt wiper agency 28A or the like which moves in unison with a ball and is designed to cleanse its open-ended raceway throughout its length of any accumulated dirt or other defilement.

The inverted carrier groove or upper race slot 24 is preferably faced downwardly and superimposed to ride freely upon a pair of strap interconnected balls. In cooperation with the respective ball pockets 25, this downturned groove completes a substantially dust proof chamber wherein its respective balls or rollers are protectively confined. As represented in Fig. 4, the inturned toe flange is kept sufficiently spaced from its cooperating race plate to permit the relatively wide cage strap 28 to move unobstructedly therebetween. It is also within the scope of my invention to unite the twin sole plates or the duplicate web flanges and thereby constitute a corresponding two-piece seat supporting structure of the shiftable type.

A keeper or retaining plate 29 may be slidably mounted upon the uppermost free face of the relatively movable toe flange. One portion of such clamping plate loosely overlaps said toe flange face while another or bridgelike portion is extended inwardly to fixedly overlie the race plate, as shown. Screw means such as 30 may be utilized to hold in place said bridgelike plate portion. The use of interposed laminated shims 31 allows said screws to be tightly drawn without binding or otherwise hindering the movable toe flange. The keeper screws are inserted through the sole plate apertures 33, and the plate corner regions are respectively provided with a foundation bolt hole 34 adapted to hold said plate solidly to its floor board.

Upon detaching the respective keeper plates, the seat together with its depending carrier may be bodily lifted directly upward and away from the complementary tracks without being obliged to slide said carriers endwise off the tracks, which dismantling in turn exposes the several balls for inspection purposes. In replacing the seat, the respective balls are preferably placed into a common extreme slot position and the carrier correspondingly superimposed upon said balls, whereupon the balls will maintain themselves in proper spaced relationship.

The reversely mounted top and bottom ball races are each purposely given a V shaped profile to afford a four-point rolling contact and thereby confine the seat against endwise movement. The respective upper and lower twin ball contact points are symmetrically disposed around each ball perimeter and thus afford true rolling motion. If desired, a rounded or other filleted race groove formation might likewise be used to provide for a two-point or three-point ball contact for either one or both of my complementary race grooves. As shown, the lowermost race contact region lies in the vicinity of the bottommost perimetric region of its rolling ball while its uppermost perimetric contact region is spaced therefrom by a distance approximately equal to twice the ball radius. Hence the base carrier 17 may be made to travel a distance approximately twice the effective length given to each of the aligned race slots 25. The use of such tandem slots is optional and if preferred, a single pocket may be substituted. It will be evident however, that the maximum degree of seat stability is obtained when the balls are at all times kept amply spaced apart and that the use of a plurality of such short slots serves to retain each of the outermost balls closely contiguous to their respective front and rear seat edges.

The respective shims 31 are intended to maintain the carrier toe flange 23 in proper operative alignment with regard to its sole plate throughout the several race slots and to snugly mount the respective free rolling balls 27 therebetween, the weight of the unoccupied seat carrier being relied upon to impose an initial load upon such floating balls sufficient to obviate any considerable ball slippage when the seat carrier is shifted thereon. In the mid travel position of the seat, each pair of strap interconnected balls should stand centrally between their respective slot ends as in Fig. 5. Assuming such balls to be rolled into one extreme of slot travel, then the transversely pierced groove edge 70A or 70B of the raised sole plate region 71 interposes an obstruction that normally prevents the respective balls from concentrating in one and the same groove pocket 25. Said groove confines also serve to limit the allowable travel of the ball center to somewhat less than the full length of the shortest component race groove. My various open drain outlets 26 are each preferably located beyond the allowable extreme ball travel position so that the balls cannot drop through any of such outlets.

In order to limit the carrier movement, a stop lug 35 may be struck up in the medial region of the toe flange as in Fig. 3. The path of this outturned lug is arranged to strike a contiguous end of the keeper plate 29 prior to allowing the ball wipers inordinately to overtravel their respective slot ends. The stop lug 35 is preferably disposed to restrict the carrier movement prior to reaching a position corresponding to the previously defined extreme ball travel position and thereby prevent the wiper means 28A from becoming jammed between the ball 27 and the end confines of its race groove.

Similar antifriction bearing results may be obtained by the use of suitable floating rollers. The base carrier is intended to likewise ride thereon in superimposed perimetrical relation, rather than being pivotally attached to roller trunions in the conventional fashion. Fig. 7 illustrates a pair of substitute rollers such as 36, of which the respective outermost edges may be beveled to fit into the V shaped race profile that is depicted in Fig.

4. The medial region of each such roller is shown undercut and pivotally embraced by the modified spacer or cage strap 44 which may also be wiper equipt. The term "a rolling medium of the floating type" as used in the claims, is intended to be inclusive of both ball and roller bearings that are pivotally unattached to a seat supporting member.

Attention is now directed to a suitable seat locking mechanism that releasably latches the carrier in fixed relation to the stationary sole plates. It is emphasized that the application of ball or roller bearings as herein practiced, allows the seat to be shifted with comparatively little effort, so that all screw or the like extraneous actuating gears may be dispensed with. For present purposes, the seat occupant merely releases my latching device, and thereupon bodily moves the loaded seat by leg thrust until a comfortable adjusted position has been found, whereupon the carrier latch is again positively fixed in place.

Such a seat locking device may comprise a manipulative lever 37 having one end pivoted at 38 to a carrier web flange. The opposite free end is shown forwardly overhung and provided with an apertured boss 39. Intermediate the lever ends, there is formed a pointed tongue or stay pin 40. Each movable carrier member 17 may be equipt with one such lever and their respective bosses interconnected by a detachable cross-bar 41 that extends along the whole of the seat edge within convenient reach of the seat occupant. Each inturned toe flange may be provided with an opening 42 (see Fig. 4) adapted to receive one of the depending stay pins. In addition, the face 32 of each sole plate may be equipt with a series of closely spaced stop holes or the like sockets such as 43, which are longitudinally disposed to assume successive registry with the pin tip when the carrier is selectively moved lengthwise of the race slots. Suitable spring means (not shown) may be employed to retain the stay pin in any one of such slots against inadvertent displacement because of road jars or the like. When the cross bar 41 is lifted into its dotted Fig. 3 position, this will simultaneously release both of said stay pins and allow the seat to be freely shifted into a different locking position, as will be understood.

The foregoing seat adjusting device is characterized by its comparative low structural height, which permits of using a correspondingly deep seat cushion for a given overall dimension as measured above the floor level. Where such seat room is to be utilized for tool, chain, battery, or other storage purposes, my ball bearing mounting affords an additional advantage in that considerable extra weight can be shiftably carried at the minimum of tractive effort. Figs. 8 and 9 show an alternative structure of this kind.

This compartmental sheet metal chest 50 may be given a rectangular shape, comprising four adjoined upright walls of which the top edge may be suitably beaded to receive the liftable seat cushion 51. A partition wall 52 may be provided to support the inset bottom plate 53 which completes the chest compartment 54 adapted to store tools, chains and the like therein. The companion compartment 55 may be kept bottomless and have a stationary radio receiving set, storage battery or the like article 56 fixedly erected upon the floor board 10, the chest width "W" then being made sufficiently long to allow of a limited seat adjustment without interference with the article that is neatly concealed within said chest.

The opposite end walls of said chest are each shown inset to constitute a ledge space 57 respectively adapted to mount within the chest confines, a sole plate 58 and a co-operating carrier member 59 corresponding to the similar companion members that have previously been described. In the present instance, the keeper plates such as 60 are preferably disposed outwardly to afford convenient access thereto. By virtue of my interposed ball or roller bearings, the loaded chest can without inordinate effort or supplemental gear means, be shifted lengthwise of the spaced tracks, and the chest contents made accessible in all positions of seat adjustment by lifting the seat cushion which serves as a lid for the shiftable chest.

It will also be observed that my manipulative cross bar 41 travels with the carrier and hence maintains a fixed location with respect to the forward edge of my shiftable seat. Said offset bar is disposed to clear and not collide with the stationary article 56. The floating ball or roller bearings as herein applied, require only infrequent oiling without befouling adjacent motor car fixtures and the ball race is intermittently wiped clean of dirt and surplus lubricant. In the event of wear, the thickness of the laminated shims 31 may be correspondingly reduced to keep the balls or rollers in proper running condition. The keeper screws 30 constitute centralized take-up means which is the sole adjustment needed to wholly correct for roller or race slot wear.

The keeper 29 need not bear tightly upon its underlying toe flange; when the seat becomes heavily loaded, said flange tends to withdraw and thus reduces the frictional drag of its superimposed keeper. The arrangement of my seat adjuster members is such that the respective components may be compactly shipped in fitted subassemblies such as Fig. 3 which is made ready to be installed in place.

Another modification designed to further the cited antifriction principle as applied to seat adjuster purposes, is schematically indicated in Fig. 10. Here a double set of ball bearings is respectively mounted both above and below an outwardly disposed toe flange 61. To this end, said flange may be longitudinally fluted to include a pair of reversely formed toe grooves 62 and 63. In such instances, the race plate 64 may again be longitudinally grooved in a fashion corresponding to previously described similar plates and have a plurality of primary balls such as 65 roll therein that may be equipt with spacer strap means. In this alternative disclosure, it is preferred to provide for an oppositely disposed or mated groove in the overhanging portion of the keeper element 66 and to interpose secondary balls 67 between said element and the other of the toe flange flutes, as shown. The last named balls may likewise be kept spaced apart by suitable strap means (not shown). If desired, shim means such as 68 may serve to simultaneously adjust the running clearance between both sets of such superimposed ball bearings.

It is to be understood that the described seat adjusting appurtenances also find application to other than vehicle purposes, and that various structural changes in the details or disposition thereof may be resorted to in likewise carrying out my illustrative embodiments, all without departing from the spirit and scope of my invention heretofore described and more particularly pointed out in the appended claims.

I claim:

1. An adjustable seat comprising a pair of spacedly mounted sole plate members each provided with an upturned face having a race slot sunk therein and which slots are respectively arranged in parallel relation, a rolling medium floatingly disposed in each such slot, complementary carrier members each provided with toe flange means that are respectively mounted to ride upon one of the aforesaid rolling media, a seat base mounted to bridge said carriers, a demountable keeper plate superimposed to slidably retain one of said toe flanges upon its underlying rolling medium and which plate is extended laterally into overlapping relation with its contiguous upturned sole plate face, and screw means mounted in an axially rectangular relation to the last named face serving to clamp the keeper plate in the direction of said face.

2. A shiftable seat comprising a stationary sheet metal sole plate having an upturned face provided with a pair of separate race slots respectively impressed into said face in axial alignment with a medial face region interposed therebetween that is kept raised relative to the respective bottommost regions of said slots and the adjacent ends of which separate slots are respectively provided with a drain outlet, a roller medium floatingly disposed in each such slot, a cage strap extending between said media in overlying relation to the aforesaid interposed face region, wiper means carried by the cage strap and serving to cleanse a slot for delivery through a drain outlet thereof, and seat carrier means superimposed to ride upon the aforesaid roller media.

3. A shiftable seat comprising a stationary sole plate having an upturned face provided with a pair of separate race slots that are respectively sunken into said face in axial alignment with a medial face region interposed therebetween that is kept raised relative to the respective bottommost regions of said slots and the contiguous ends of which separate slots are respectively provided with a drain outlet, a roller medium floatingly disposed in each such slot, a cage strap extending between said media in overlying relation to the aforesaid interposed face region, duplicate wiper means carried by the cage strap and serving to cleanse said pair of slots for delivery through the respective drain outlets thereof, a seat carrier member provided with toe flange means mounted to ride upon the rolling media, a demountable keeper plate superimposed to slidably retain said toe flange and which keeper is extended laterally to overlap the upturned sole plate face, and adjustable clamping means serving to draw the laterally extended keeper plate portion toward its contiguous upturned sole plate face.

4. In a bodily shiftable seat, the combination of a stationary sole plate comprising a pair of open ended race slots disposed in axial alignment and having their contiguous ends spaced apart, a roller medium of the floating type disposed in each such slot to travel lengthwise therealong, a cage strap extending between said roller media, wiper means for each such slot carried by the cage strap, stop means confining the wiper travel to a distance somewhat smaller than the length of one such slot, and carrier means disposed beneath the seat and superimposed to ride upon said media.

5. A shiftable seat comprising a sole plate member provided with a race slot, a rolling medium disposed in said slot, a carrier member mounted to ride upon the rolling medium, keeper means detachably secured to the sole plate member and provided with an extended portion that overhangs the carrier member, a secondary rolling medium mounted between the keeper means and the carrier member, and common means serving to adjustably fix the running clearance on part of both rolling media.

STANLEY K. BISHOP.